J. A. GOLDEN.
TOWEL HEATER AND STERILIZER.
APPLICATION FILED MAR. 11, 1914.
1,122,271.
Patented Dec. 29, 1914.
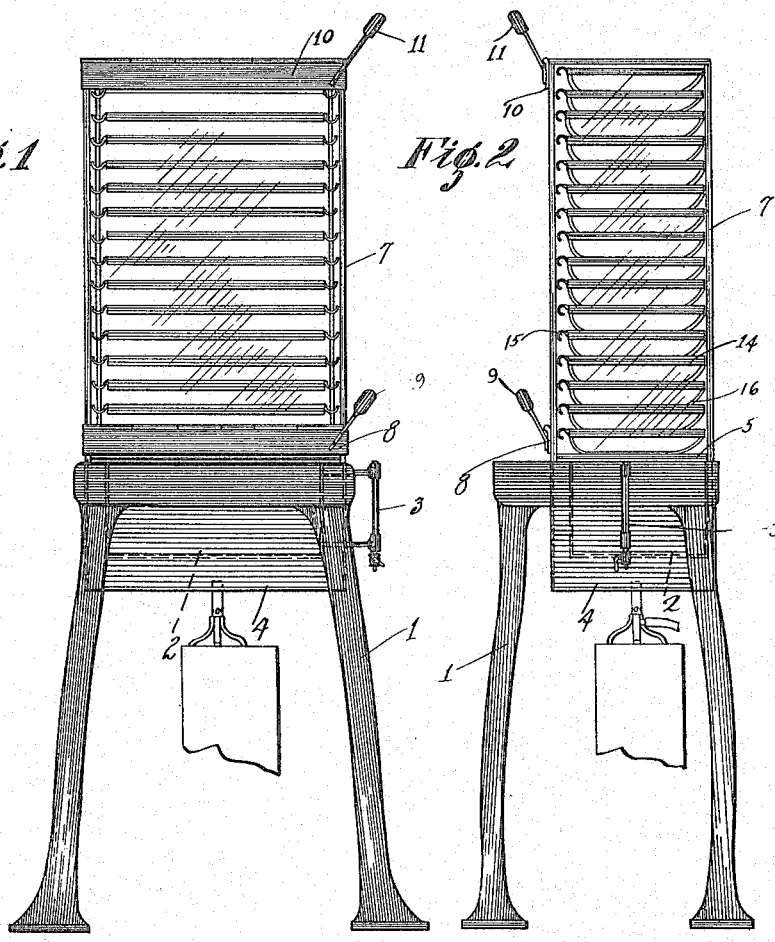
WITNESSES:
INVENTOR.
James A. Golden
BY
ATTORNEY

UNITED STATES PATENT OFFICE.

JAMES A. GOLDEN, OF STOCKTON, CALIFORNIA.

TOWEL HEATER AND STERILIZER.

1,122,271.

Specification of Letters Patent.

Patented Dec. 29, 1914.

Application filed March 11, 1914. Serial No. 823,896.

*To all whom it may concern:*

Be it known that I, JAMES A. GOLDEN, a citizen of the United States, residing at Stockton, in the county of San Joaquin and State of California, have invented certain new and useful Improvements in Towel Heaters and Sterilizers; and I do declare the following to be a clear, full, and exact description of the same, reference being had to the accompanying drawings, and to the characters of reference marked thereon, which form a part of this application.

This invention relates to improvements in paraphernalia used in barber shops and similar places where hot towels are used, the object of the invention being to produce a structure by means of the use of which the towels are heated and at the same time thoroughly sterilized and cleansed, all of which is accomplished in a semi-automatic manner permitting the towels to be taken out of the apparatus and inserted into the same again in a rapid and efficient manner.

A further object of the invention is to produce a simple and inexpensive device and yet one which will be exceedingly effective for the purposes for which it is designed.

These objects, I accomplish by means of such structure and relative arrangement of the parts as will fully appear by a perusal of the following specification and claims.

On the drawings, similar characters of reference indicate corresponding parts in the several views.

Figure 1 is an end view of the complete structure. Fig. 2 is a side elevation of the same. Fig. 3 is a perspective view of one of the trays of the device shown in its holder. Fig. 4 is a perspective view of a perforated cover for the water pan.

Referring now more particularly to the characters of reference on the drawings, the numeral 1 designates a supporting standard of any desired structure mounted on which is a water pan or holder 2 provided with a gage 3 and disposed around which pan 2 is a casing 4 adapted to receive any suitable heating elements such as gas burners, electrical resistance coils, oil burners, or in fact any form of heating means, none of these being here shown for the reason that I make no specific claim for any particular form of such heating means.

Disposed over the top of the pan 2 is a rectangular frame 5 carrying a perforated cover 6 of wire mesh or any other suitable perforated material, which member 5—6 forms the bottom for an inclosed rectangular receptacle 7 mounted on the receptacle 1 which can be of any suitable material but more particularly of glass, whereby the interior tray mechanism may be clearly seen by a customer, as shown in Figs. 1 and 2. At the lower end of the front of the member 7 is a hinged door 8 having a weighted handle 9 and at the upper end of such front is another similar hinged door 10 having a weighted handle 11, the balance of the member 7, with the exception of these two doors, being completely inclosed on all sides.

Disposed within the member 7 are a plurality of trays mounted one upon the other in successive order, each of said trays comprising a rectangular frame 12 holding perforated material 13 forming the bottom of the tray. Each frame 12 has a slotted guide 14 at each end and a projecting handle member 15 along its front edge. On the underside of each of the members 14 is a slide or runner 16, which runners on one of the trays project into the corresponding guides 14 on the next succeeding tray immediately below the same. Thus the runners 16 on the lowermost one of the trays rest on the sides of the frame 5 and immediately adjacent the door 8 while the uppermost tray is immediately adjacent the door 10.

In practice, the water in the receptacle 2 is kept heated to such a degree as will cause sterilizing steam to pass up through the member 6 and members 13. A towel is then placed on each of the members 13 so that the percolation of the steam thoroughly cleanses and sterilizes all of the towels in all of the trays. When the operator desires a hot towel he opens the door 8, the weight of the handle 9 holding it open, and draws out the lowermost tray by means of its handle 15, the runners 16 of the next tray above bearing on the guides 14. Then since this removes the support for all the trays above said lowermost one, said trays will drop down a distance equal to the height of such tray so removed. This then leaves a corresponding space at the upper end of the trays adjacent the door 10 and the operator then removes the towel from the tray he has taken out and places another towel therein and inserts the same through the door 10, thus filling the receptacle again. In this way the coldest towel is always at the top of the pile and must stay in the receptacle for the entire time consumed in removing all of the trays, so that this gives it a sufficient time to become thoroughly heated, cleansed and sterilized so that there can be no chance of any infection or similar trouble arising from the use of the towels on more than one person.

The width of the trays 8 and 10 is only sufficient to allow of one tray at a time being taken out or inserted through the same so that the function of the structure can not be defeated by the laziness or carelessness of the operator.

From the foregoing description it will readily be seen that I have produced such a device as substantially fulfils the objects of the invention as set forth herein.

While this specification sets forth in detail the present and preferred construction of the device, still in practice, such deviations from such detail, may be resorted to as do not form a departure from the spirit of the invention.

Having thus described my invention what I claim as new and useful and desire to secure by Letters Patent is:—

A towel heater and sterilizer comprising a receptacle provided with a door at its upper and lower end, a plurality of trays disposed in said receptacle, one above the other in successive order, each tray comprising a rectangular frame having a perforated bottom, such frame having a slotted guide at each end on the upper side and a runner at each end on the underside, such runners being adapted to slide in the slotted guides of the adjacent tray, and means for admitting a heated element to said receptacle, as described.

In testimony whereof I affix my signature in presence of two witnesses.

JAMES A. GOLDEN.

Witnesses:
STEPHEN N. BLEWETT,
FLOYD M. BLANCHARD.

Copies of this patent may be obtained for five cents each, by addressing the "Commissioner of Patents, Washington, D. C."